Richard N. Hill
Harry S. Brackney
INVENTORS

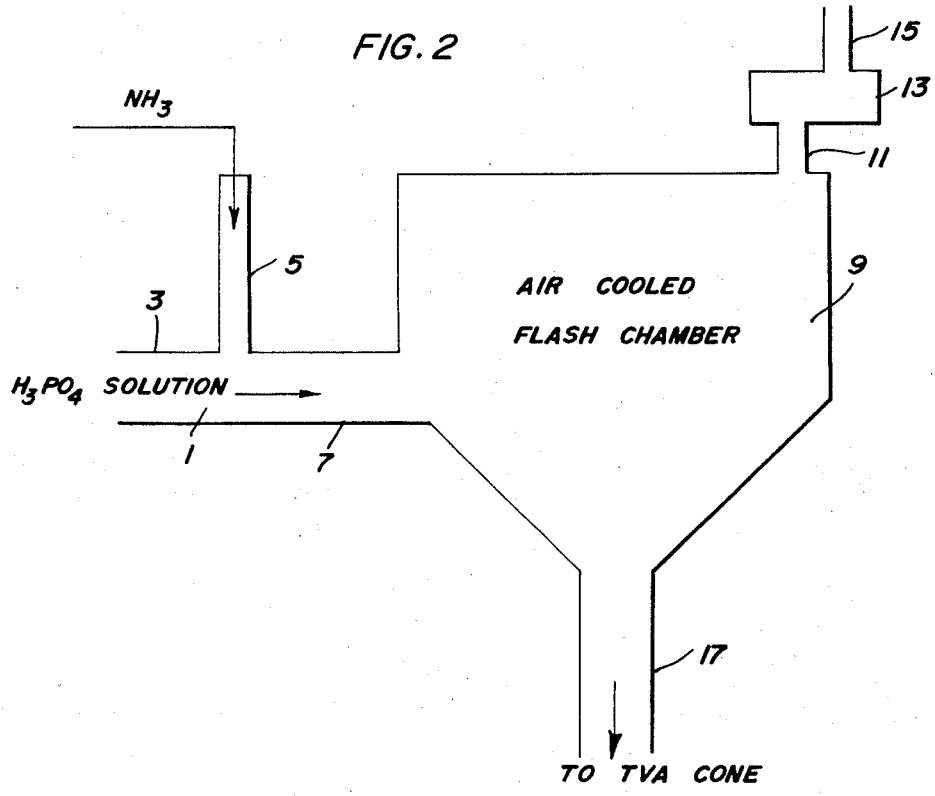
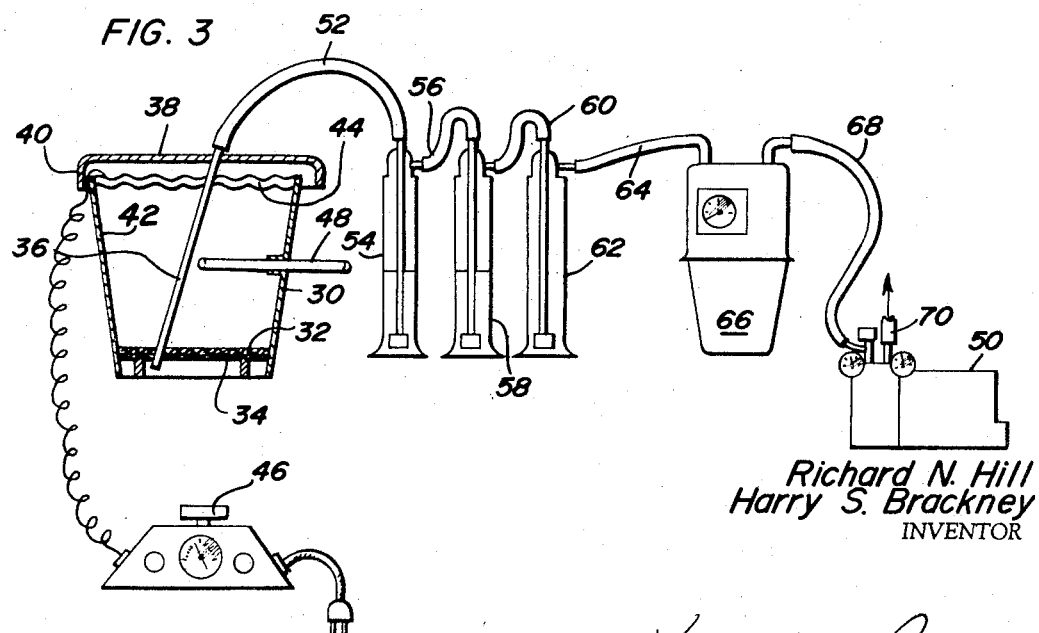

United States Patent Office 3,431,096
Patented Mar. 4, 1969

---

3,431,096
PROCESS FOR REDUCING THE EVOLUTION OF FLUORINE VALUES FROM TRIPLE SUPERPHOSPHATE FERTILIZER
Richard N. Hill and Harry S. Brackney, Lakeland, Fla., assignors to W. R. Grace & Co., New York, N.Y., a corporation of Connecticut
Continuation-in-part of application Ser. No. 595,022, Nov. 17, 1966. This application Dec. 21, 1966, Ser. No. 603,571
U.S. Cl. 71—41      2 Claims
Int. Cl. C05b 1/06

---

ABSTRACT OF THE DISCLOSURE

In abstract, this invention is directed to a process for substantially reducing the evolution of fluorine values from triple superphosphate fertilizer comprising preparing said fertilizer by reacting phosphate rock with phosphoric acid to which a nitrogen-containing material selected from the group consisting of ammonia and urea has been added in an amount such that the thus added nitrogen will be equivalent, on a weight basis, to about 0.4–1.25% of the resulting triple superphosphate.

---

Figure 1:
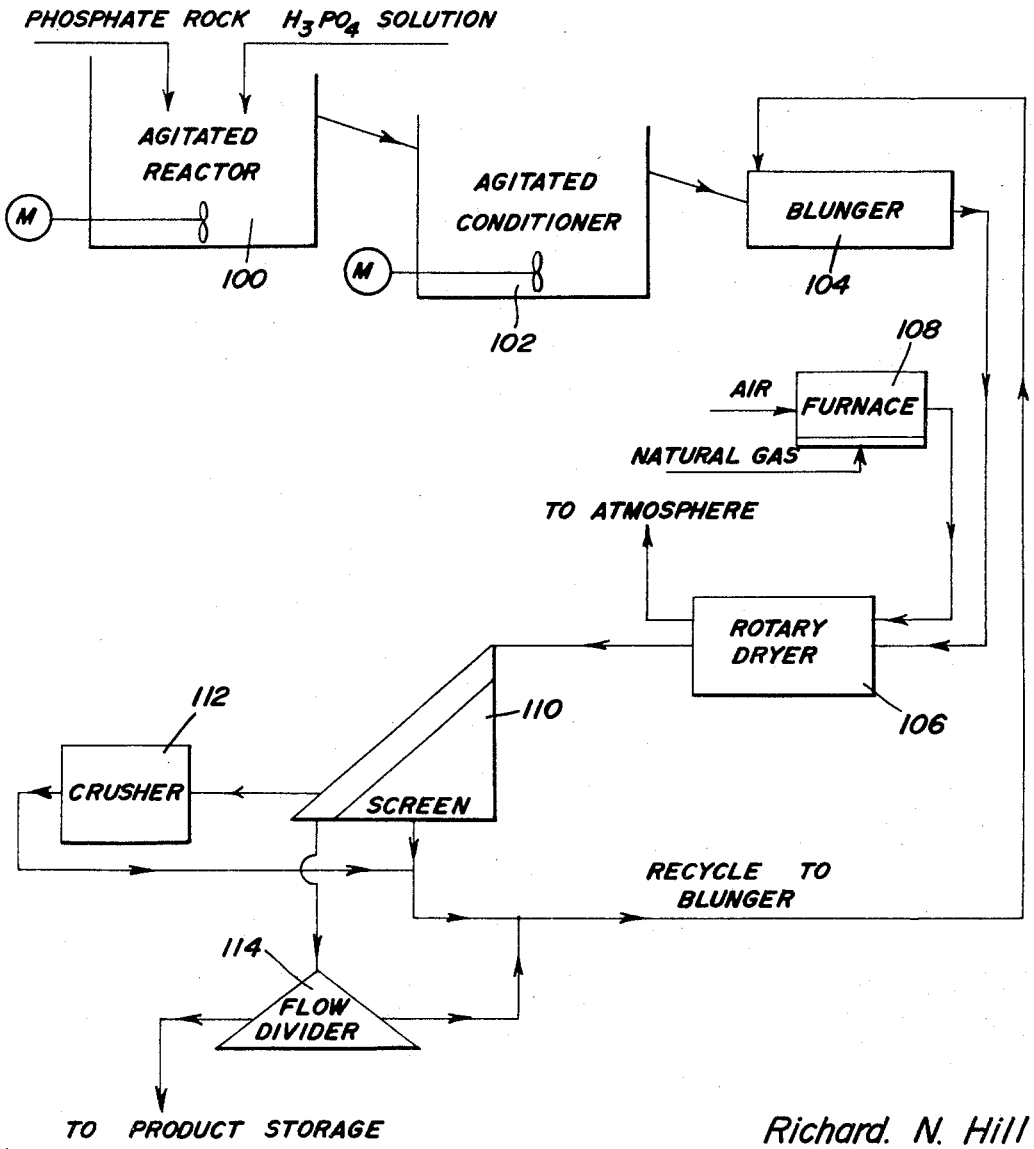

This application is a continuation-in-part of our application Ser. No. 595,022, filed Nov. 17, 1966, and now abandoned.

This invention is in the fertilizer art and it relates specifically to a process for decreasing the evolution of fluorine values from triple superphosphate fertilizer in storage.

Decreasing the evolution of fluorine values in storage is important because fluorine compounds evolved from large quantities of triple superphosphate in storage constitute a serious air pollution problem. In the prior art, storage buildings were closed except for an inlet and an outlet, and air was drawn through said buildings. After issuing from the outlet was scrubbed with water (to remove fluorine compounds) prior to venting said air to the atmosphere.

In summary, this invention is directed to a process for substantially reducing the evolution of fluorine values from triple superphosphate fertilizer comprising preparing said fertilizer by reacting phosphate rock with phosphoric acid solution to which a nitrogen-containing material selected from the group consisting of ammonia, urea, and mixtures thereof has been added in a quantity such that the thus added nitrogen is equivalent, on a weight basis, to about 0.4–1.25% of the resulting triple superphosphate.

In the drawings: FIG. 1 is a flowsheet of a typical process for manufacturing granular triple superphosphate. FIG. 2 is a flowsheet of a preferred method for adding ammonia to phosphoric acid solution. FIG. 3 is a flowsheet of a process that we prefer to use to measure the relative rates of evolution of fluorine values from various samples of ammonium triple superphosphate.

Run of pile triple superphosphate fertilizer (ROP) is generally prepared by contacting fine particles of phosphate rock (about 75–80% being −200 mesh and less than about 5% being +35 mesh) analyzing about 33–36% $P_2O_5$, preferably about 34–35% $P_2O_5$ with wet process phosphoric acid solution analyzing about 50–56% $P_2O_5$, preferably about 53–54% $P_2O_5$, in the weight ratio of about 1.72 tons of said acid analyzing about 54% $P_2O_5$ per ton of phosphate rock (where using stronger (more concentrated) acid solution a proportionately smaller quantity of such acid solution is used per ton of rock and where using weaker (more dilute) acid solution a proportionately larger quantity of such acid solution is used per ton of rock) in a so-called TVA Cone of the general type shown on page 303 of Wm. H. Waggaman, "Phosphoric Acid, Phosphates, and Phosphatic Fertilizers," Reinhold Publishing Corporation, 1952 (hereinafter called "Waggaman"), discharging the thus formed mixture onto an endless rotary belt conveyor moving at such speed that the residence time on the belt is about 18–20 minutes, breaking the material discharged from the belt into irregular particles ranging in size from large particles about 6–10 inches across and 2–4 inches or more in thickness to fine dust-like particles (i.e., particles passing about a 40 mesh screen), transferring (e.g., via a belt conveyor, screw conveyor, pneumatic conveyor or the like) the thus formed particles to a storage building where the particles are retained in large piles (e.g., up to about 5,000–25,000 tons) and aged or retained in storage for about 3–6 weeks. Typical apparatus of the general type used is described on pages 300–305 of Waggaman. Page 303 of Waggaman presents a schematic diagram of a typical TVA Cone and page 305 a flowsheet of a typical plant for making ROP with a TVA Cone.

A typical sample of ROP analyzes about:

| Component: | Percent |
|---|---|
| Moisture | 4.4 |
| Total $P_2O_5$ | 48.0 |
| Citrate insoluble $P_2O_5$ | 1.0 |
| Available $P_2O_5$ | 47.0 |
| Free acid | 2.4 |
| CaO | 20.3 |
| F | 2.4 |
| $Fe_2O_3$ | 1.5 |
| $Al_2O_3$ | 1.8 |
| $SO_4$ | 2.6 |

Although furnace grade phosphoric acid solution can be used to make excellent ROP, economic considerations favor the use of wet process phosphoric acid solution.

During storage fluorine values are evolved from the ROP piles into the air, thereby causing a most serious air pollution problem—fluorine values in air being objectionable because they are toxic and irritating to the eyes and respiratory system. For example, a 5,000 ton pile of ROP can evolve fluorine compounds containing up to about 300 or more pounds of fluorine per day.

Granular triple superphosphate is prepared from phosphate rock and phosphoric acid solution. FIG. 1 is a flowsheet of a typical process for preparing granular triple superphosphate. Fine particle (e.g., 65–80% −200 mesh and less than about 5% being +35 mesh) of phosphate rock analyzing about 33–36% $P_2O_5$ and phosphoric acid solution analyzing about 37–41% $P_2O_5$ are reacted in a stirred, or agitated, reactor 100 to form a slurry which passes to agitated conditioner 102, the conditioned slurry then passes to blunger 104 where said slurry is granulated. Granules exit blunger 104, are dried in rotary drier 106 with hot gas (e.g., directly heated air) from furnace 108—preferably using concurrent flow in the drier. The hot gas (air) temperature can be about 500–700° C. (preferably about 600–700° C.), but the granules are not heated above about 105° C. The thus dried granules pass to screen 110 where they are screened; all oversize particles (e.g., +6 mesh particles) pass to crusher 112 where they are crushed and recycled to blunger 104; all fine particles (e.g., −12 mesh particles) are recycled to the blunger. Product size (e.g., −6 mesh, +12 mesh) granules pass from screen 110 to conventional flow divider 114 which can be an overflow bin with means for varying the overflow therefrom, a two leg chute with movable flow spacers between the legs, or the like; said flow divider recycles sufficient product size granules to blunger 104 to maintain a recycle ratio of about 7–10; and the remainder of the product size granules are sent to storage where they remain in piles of several thousand tons (e.g., ca. 2,000–40,000 tons) for periods of up to several weeks. A 5,000 ton pile of granular triple superphosphate can evolve fluorine compounds containing up to about 200 or more pounds of fluorine per day.

We have made the surprising and completely unobvious discovery that the evolution of fluorine values from ROP and granular triple superphosphate is very greatly decreased by preparing the triple superphosphate from phosphoric acid (either wet process phosphoric acid or furnace grade phosphoric acid) to which a nitrogen-containing material selected from the group consisting of ammonia, urea, and mixtures thereof has been added in a quantity such that the thus added nitrogen is equivalent, on a weight basis, to about 0.4–1.25% (preferably about 0.65–0.8%) of the triple superphosphate formed by the reaction of the thus treated acid with fine particles of phosphate rock. Although quantities of nitrogen in excess of about the aforesaid 1.25% can be used with excellent results in the process of our invention, no significant gain is made by using such larger quantities; for example, evolution of fluorine values is about the same when about 1.25% nitrogen or about 2.5% nitrogen (based on weight of triple superphosphate formed) is added to the phosphoric acid. In addition, it has been noted that the use of larger quantities (e.g., ca. 2.5–4%) of nitrogen in the form of ammonia favors reversion (formation of citrate insoluble phosphate values in the ROP). Citrate insoluble phosphate is generally considered to be unavailable for use as plant food. $P_2O_5$ determinations including the determination of citrate insoluble $P_2O_5$ were made according to the methods of the tenth edition of Official Methods of Analysis of the Association of Agricultural Chemists.

A large pile (i.e., about 5,000 tons) of ROP made by a conventional procedure can evolve fluorine compounds containing up to about 300 lbs. of fluorine per day while a pile of ROP of substantially the same size prepared by the process of our invention will evolve fluorine compounds containing only about 40–45 lbs. of fluorine per day, and a similar pile of granular triple superphosphate can evolve fluorine compounds containing up to about 200 pounds (or more) fluorine per day.

We prefer to add a nitrogen-containing material selected from the group consisting of ammonia, urea, and mixtures thereof in fluid form to phosphoric acid solution. Where the nitrogen-containing material is ammonia, said ammonia can be liquid anhydrous ammonia, aqueous ammonia, or ammonia vapor. Where the nitrogen-containing material is urea, said urea can be added in the form of an aqueous solution of urea. Where the nitrogen-containing material is a mixture of ammonia and urea, said mixture can be an aqueous solution comprising water, ammonia, and urea or said mixture can be a solution of urea in liquid anhydrous ammonia. Alternatively, the urea and the ammonia can be added separately. Also, urea can be added as solid urea and the resulting mixture of urea and phosphoric acid solution agitated vigorously after adding the solid urea. For example, solid urea can be added to an agitated zone (e.g., a tank) containing phosphoric acid. Said zone must be provided with a cooling means—e.g., heat exchanger, flash chamber, or the like.

Where adding the aforesaid nitrogen-containing material in the form of a fluid (e.g., liquid anhydrous ammonia, aqueous ammonia, ammonia vapor, an aqueous solution of urea, an aqueous solution of ammonia and urea, or a solution of urea in liquid anhydrous ammonia), we prefer to add said fluid at a measured rate to a stream of phosphoric acid (e.g., wet process phosphoric acid analyzing about 50–56% $P_2O_5$, preferably about 53–54% $P_2O_5$ where making ROP and about 37–41% $P_2O_5$ where making granular triple superphosphate), using a mixing T to introduce the aforesaid fluid into the acid stream. Since heat is produced when said fluid is added to the acid, the acid stream becomes so hot that water is flash evaporated from the thus treated phosphoric acid solution as said solution passes from the acid lines into a zone (e.g., a TVA Cone or an agitated reactor) where said acid solution contacts phosphate rock to form triple superphosphate, we have found it necessary to cool the phosphoric acid solution after adding said fluid to said acid solution.

FIG. 2 is a flowsheet of a method which we prefer to use where adding the aforesaid nitrogen-containing material (i.e., ammonia, urea, or a mixture thereof) in the form of a fluid—i.e., as a nitrogen-containing fluid—to phosphoric acid solution in the process of our invention and then cooling the resulting hot mixture prior to using the thus treated phosphoric acid solution to make triple superphosphate. Phosphoric acid solution, at a predetermined rate, enters T 1 via a first arm 3, and the aforesaid nitrogen-containing fluid, having a predetermined nitrogen concentration and flowing at a predetermined rate, enters T 1 via a second arm 5, thereby to contact and react with said phosphoric acid solution in T 1. The thus treated hot phosphoric acid solution passes from T 1 via arm 7, which communicates with air cooled flash chamber 9, into said flash chamber. Chamber 9 is vented to the atmosphere via line 11, vacuum pump 13, and line 15. Vacuum pump 13 can be a steam jet, air jet, water pump, or the like; said pump maintains a reduced pressure (e.g., ca. ½–¾ atmosphere absolute) in flash chamber 9. The thus treated hot phosphoric acid solution flashes in flash chamber 9, thereby cooling said hot solution. Part of the thus evaporated water is condensed in said chamber 9 and returned to the acid solution, and part of said evaporated water passes, as vapor, to the atmosphere via line 11, vacuum pump 13 and line 15. The thus cooled acid solution passes from flash chamber 9 via barometric leg 17 which can communicate with the phosphoric acid solution feed line of a conventional TVA Cone of the type described by Waggaman, with a phosphoric acid storage tank, or with an agitated reactor (e.g., reactor 100 of FIG. 1) of the type used to make granular triple superphosphate. If desired, flash chamber 9 can be water cooled.

As a result of our disclosure, it will be readily apparent to those skilled in the art that the phosphoric acid solution, after being treated with a nitrogen-containing material selected from the group consisting of ammonia, urea, and mixtures thereof, can be cooled by replacing the flashing chamber with a liquid cooled reflux type condenser. Our disclosure will also make it apparent that the flash chamber can be replaced with a liquid cooled heat exchanger which can be positioned to receive hot acid solution issuing from mixing T 1, thereby to cool said acid solution before the acid solution is used to form triple superphosphate.

Another method which we have used with excellent results to add the aforesaid nitrogen-containing fluid to phosphoric acid solution comprises: (a) continuously metering phosphoric acid solution and said nitrogen-containing fluid into an agitated tank (i.e., an agitated reactor tank); (b) continuously withdrawing hot product from said tank at substantially the same rate the reactants were added; (c) continuously cooling the withdrawn product (e.g., with a water cooled heat exchanger or without partial vacuum).

Our invention will be further illustrated by the following examples which are illustrative only and which are not intended to limit the scope of the invention.

Example I

About 10,000 tons of ROP was made by reacting phosphate rock analyzing about:

| Component | Percent |
|---|---|
| $P_2O_5$ | 35.0 |
| CaO | 48.7 |
| $CO_2$ | 3.0 |
| $Fe_2O_3$ | 1.0 |
| $Al_2O_3$ | 1.1 |
| Fluorine | 3.8 | with wet process phosphoric acid solution analyzing about:

| Component | |
|---|---|
| $P_2O_5$ | 54.1 |
| $H_2SO_4$ | 4.0 |
| $Fe_2O_3$ | 1.3 |
| $Al_2O_3$ | 1.4 |
| Fluorine | 1.1 |

The phosphate rock was fed into the system at a rate of about 15.6 tons per hour and the phosphoric acid solution feed rate was about 26.8 tons per hour. The rock and acid were fed into a conventional TVA Cone where they were contacted. The resulting mixture of acid and rock passed onto an endless belt conveyor moving at such speed that the residence time of said mixture on the belt was about 18 minutes. Lumps of product discharged from the belt were broken into particles ranging in size from large particles about 6–8 inches across to particles passing about a 30 mesh screen. Said particles were transferred to a storage building via a belt conveyor where a large representative sample (about a ton) was collected by a conventional automatic sampler. This sample was reduced by a conventional coning and quartering technique until a representative sample weighing about 40 pounds was obtained. Analysis of this sample showed that it contained 2.4% fluorine.

FIG. 3 is a flowsheet illustrating the method and apparatus that we use to compare the relative rates of evolution of fluorine values from samples of triple superphosphate including samples of triple superphosphate prepared from ammonia-treated phosphoric acid solution according to the process of our invention.

A 35 pound sample of triple superphosphate (ROP) was placed in 5 gallon container 30 on top of a filter cloth 32, supported by a ½ inch mesh screen 34 which was positioned about 1 inch from the bottom of container 30. A gas sampling tube 36 extended into the space between the screen and the bottom of the container. A loosely fitting cover 38 was placed over container 30; said cover being so positioned that air entering container 30 passed between a downward extending lip 40 of said cover and the wall 42 of said container. An electrically heated tape 44 was wrapped around the upper portion of wall 42 of container 30 so that air entering said container was heated. The voltage supplied to tape 44 was so adjusted with voltage regulator 46 that the temperature in about the center of the ROP in container 30, as measured by thermometer 48, was maintained at about 60° C. Gas sampling tube 36 communicated with air pump 50 via tube 52, gas scrubber 54, tube 56, gas scrubber 58, tube 60, gas scrubber 62, tube 64, gas meter 66, and tube 68. Pump 50 was vented to the atmosphere via line 70. Gas scrubbers 54 and 58 were each filled about ⅓ full with distilled water to absorb fluorine values from air passing through said scrubbers. No water was added to gas scrubber 62 which served as a mist catcher. Pump 50 was operated at such rate to draw air (measured at about ambient conditions, i.e., ca. 20–25° C. and 750–760 millimeters of mercury) through the system at about 6 cubic feet per hour. Each 24 hours, for a period of 21 days, the scrubbing solution (distilled water) was removed from the two upstream scrubbers and placed in a beaker; then each of the three scrubbers was washed, and the washings were added to the aforesaid scrubbing solution from the two upstream scrubbers to give a composite which was analyzed for fluorine by a conventional method (titration with thorium nitrate using alizarin red S as indicator). The results of the above-described twenty-one day fluorine evolution test are presented below:

TABLE I

Twenty-one day fluorine evolution test

| Day | Milligrams of fluorine asborbed In liquid in gas scrubbers |
|---|---|
| 1 | 40 |
| 2 | 25 |
| 3 | 15 |
| 4 | 15 |
| 5 | 10 |
| 6 | 20 |
| 7 | 65 |
| 8 | 80 |
| 9 | 85 |
| 10 | 90 |
| 11 | 140 |
| 12 | 105 |
| 13 | 95 |
| 14 | 120 |
| 15 | 195 |
| 16 | 300 |
| 17 | 310 |
| 18 | 320 |
| 19 | 270 |
| 20 | 215 |
| 21 | 235 |
| Cumulative total | 2750 |

Example II

The general procedure of Example I was repeated; however, in this instance the procedure was modified by adding liquid anhydrous ammonia, at the rate of about 20 pounds of ammonia per ton of ROP (i.e., about 16.5 pounds of N per ton of ROP), to the phosphoric acid solution via a mixing T, and cooling the thus ammonia-treated acid solution in an air cooled flashing chamber using reduced pressure (ca. ¾ atmosphere absolute) before passing the ammonia-treated acid to the TVA Cone where said acid was brought into contact with phosphate rock.

A 40 pound representative sample of the thus produced ROP was collected by the procedure described in Example I. A sample of the ROP made from the ammonia-treated phosphoric acid was found to analyze 2.5% fluorine. A 35 pound sample of said ROP was subjected to the twenty-one day fluorine evolution test described in Example I. Results of said test are presented in Table II.

TABLE II

Twenty-one day fluorine evolution test

| Day | Milligrams of fluorine asborbed In liquid in gas scrubbers |
|---|---|
| 1 | 25 |
| 2 | 25 |
| 3 | 15 |
| 4 | 20 |
| 5 | 15 |
| 6 | 15 |
| 7 | 15 |
| 8 | 15 |
| 9 | 15 |
| 10 | 15 |
| 11 | 15 |
| 12 | 20 |
| 13 | 15 |
| 14 | 15 |
| 15 | 15 |
| 16 | 15 |
| 17 | 15 |
| 18 | 10 |
| 19 | 15 |
| 20 | 20 |
| 21 | 25 |
| Cumulative total | 355 |

The results of Example II where read in the light of Example I show that the evolution of fluorine values from ROP prepared according to the process of our invention from phosphoric acid solution treated with ammonia is very substantially less than that from ROP prepared from phosphoric acid solution which was not treated with ammonia.

Other runs made in which ammonia was added to phosphoric acid solution at a rate of about 10 pounds of ammonia (i.e., 8.2 pounds of N) per ton of ROP product produced substantially the same result as was obtained with 20 pounds of ammonia per ton of ROP, and runs made adding ammonia at the rate of about 16 and 40 pounds of ammonia per ton of ROP product also substantially reduced the evolution of fluorine values—giving results substantially the same as those reported in Table II.

Example III

A 40 pound representative sample of granular triple superphosphate fertilizer prepared in a conventional manner from wet process phosphoric acid was collected from a production lot of granular triple superphosphate fertilizer. This material analyzed about 2.4% fluorine.

A 35 pound portion of said sample was subjected to the twenty-one day fluorine evolution test described in Example I. A cumulative total of 1850 milligrams of fluorine had been evolved at the end of said test.

Example IV

The general procedure of Example III was repeated. However, in this instance the granular triple superphosphate was prepared from wet process phosphoric acid to which ammonia had been added in an amount equivalent to about 20 pounds of nitrogen per ton of the granular triple superphosphate formed. This triple superphosphate analyzed about 2.4% fluorine.

At the end of a twenty-one day fluorine evolution test a cumulative total of 230 milligrams of fluorine had been evolved from a 35 pound sample of the thus prepared triple superphosphate.

Example V

The general procedure of Example II was repeated; however, in this instance an aqueous solution of urea (ca. 25% urea by weight) was added to the phosphoric acid solution, via T 1 of FIG. 2, at such rate as to add about 17 pounds of nitrogen per ton of ROP produced. The resulting ROP analyzed about 2.6% fluorine. The rate of fluorine evolution from a 35 pound sample of the thus prepared ROP was substantially the same as that from the sample tested in Example II. During a 21 day fluorine evolution test a total of 360 milligrams of fluorine was evolved.

Example VI

The general procedure of Example V was repeated; however, in this instance the nitrogen-containing fluid was a solution of urea in liquid anhydrous ammonia (ca. 10% urea and 90% ammonia). Said nitrogen-containing fluid was added to the phosphoric acid solution at such rate as to add about 16 pounds of nitrogen to each ton of ROP produced. The resulting ROP contained about 2.5% fluorine. The rate of fluorine evolution from a 35 pound sample of said ROP was about the same as that in Example V. During a 21 day fluorine evolution test, a total of about 350 milligrams of fluorine was evolved.

Substantially identical fluorine evolution rates were observed where testing a 35 pound sample of ROP prepared from phosphoric acid solution to which the aforesaid nitrogen-containing fluid (i.e., 10% urea and 90% liquid anhydrous ammonia) had been added at such rate as to provide about 8 pounds of N per ton of ROP.

Runs in which ammonia, urea, and mixtures thereof were added to phosphoric acid solution at such rates that triple superphosphate (ROP and granular triple superphosphate) made from the thus treated acid contained about 0.1, 0.2, and 0.3% N have produced triple superphosphate which, on storage, evolved excessive quantities of fluorine values (e.g., ca. 100–150 or more pounds of fluorine per day from piles containing about 5,000–6,000 tons of triple superphosphate).

Thus, it is readily apparent that the process of our invention substantially reduces the evolution of fluorine values from both ROP and granular triple superphosphate.

As used herein, unless otherwise defined where used: (a) the term "percent" (%) means percent by weight; (b) the terms "mesh" or "screen size" refer to U.S. standard mesh or screen size; and (c) the term "phosphoric acid" means orthophosphoric acid ($H_3PO_4$); and (d) the terms "lb." and "lbs." mean pound and pounds, respectively.

What is claimed is:

1. A process for substantially reducing the evolution of fluorine values from triple superphosphate fertilizer comprising preparing said fertilizer by reacting phosphate rock with phosphoric acid solution to which a nitrogen-containing material selected from the group consisting of ammonia, urea, and mixtures thereof has been added in a quantity such that the thus added nitrogen is equivalent, on a weight basis, to about 0.4–1.25% of the resulting triple superphosphate.

2. The process of claim 1 in which about 0.65–0.8% of nitrogen based on weight of triple superphosphate product is added to the phosphoric acid solution.

References Cited

UNITED STATES PATENTS

| | | | |
|---|---|---|---|
| 2,022,672 | 12/1935 | Kniskern et al. | 71—28 X |
| 2,037,706 | 4/1936 | Curtis | 71—41 |
| 3,266,885 | 8/1966 | Caldwell | 71—41 X |

DONALL H. SYLVESTER, *Primary Examiner.*

T. G. FERRIS, *Assistant Examiner.*

U.S. Cl. X.R.

71—28